United States Patent [19]
Chou et al.

[11] Patent Number: 5,981,761
[45] Date of Patent: *Nov. 9, 1999

[54] CROSSLINKED POLYASPARTATE SALTS A PROCESS FOR THEIR PRODUCTION

[75] Inventors: Yueting Chou, Chesterfield; Dennis J. Kalota, Fenton, both of Mo.; David Albert Martin, Angel Fire, N.Mex.

[73] Assignee: Solutia Inc., St. Louis, Mo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/825,085

[22] Filed: Mar. 27, 1997

[51] Int. Cl.$^6$ .................................................. C07D 233/60
[52] U.S. Cl. ........................... 548/339.1; 435/6; 435/7.2; 436/521; 436/536; 530/391.3; 536/23.1; 536/391.5; 548/542
[58] Field of Search .................................. 435/6, 7.2, 12, 435/175, 181, 183, 188, 280, 424; 436/2, 521, 536, 544, 547; 530/391.3, 391.5; 536/23.1, 24.3; 548/339.1, 542

[56] References Cited

U.S. PATENT DOCUMENTS

| | | | |
|---|---|---|---|
| 4,434,228 | 2/1984 | Swann | 435/108 |
| 4,556,689 | 12/1985 | Murakami et al. | 525/54.1 |
| 4,803,168 | 2/1989 | Jarvis, Jr. | 435/240.22 |
| 5,062,980 | 11/1991 | Migdal et al. | 252/51.5 A |
| 5,142,062 | 8/1992 | Knebel et al. | 548/545 |
| 5,247,068 | 9/1993 | Donachy et al. | 530/350 |
| 5,284,936 | 2/1994 | Donachy et al. | 530/350 |
| 5,461,085 | 10/1995 | Nagatomo et al. | 521/183 |
| 5,478,919 | 12/1995 | Koskan et al. | 528/363 |
| 5,484,945 | 1/1996 | Nagatomo et al. | 548/520 |
| 5,525,682 | 6/1996 | Nagatomo et al. | 525/420 |
| 5,525,703 | 6/1996 | Kalota | 528/363 |
| 5,650,270 | 7/1997 | Giese et al. | 435/6 |
| 5,834,568 | 11/1998 | Chou | 525/420 |

FOREIGN PATENT DOCUMENTS

| | | |
|---|---|---|
| 0387346B1 | 9/1990 | European Pat. Off. . |
| 0658586A1 | 6/1995 | European Pat. Off. . |
| WO9608523 | 3/1996 | WIPO . |

OTHER PUBLICATIONS

Abstract: JP07313178 relates to Pepn. of L–aspartic acid comprises acting (A) an enzyme–contg. material having both the activities of the maleic acid isomerase and aspartase or (B) an enzyme–contg. material having the activity of the isomerase and an enzyme–contg. material having the activity of the aspartase on a substrate medium congt. maleic acid, ammonia and an alkali metal ion to form L–aspartic acid and adding mineral acid to the reaction mixt. to filtrate and recover the crystals of L–aspartic acid and discharge waste liq. contg. Alkali metal salts(s) of the mineral acid.

Abstract: JP61015899A—relates to Novel protein–polysuccinimide complexes comprise a combination of (I) a physiological active protein and (II) a polysuccinimide deriv. of units (1)–(6): COCH(CH2.COX); COCH2CH(COX)NH; COCH(CH2COY); COCH2CH(COY)NH; COCH(CH2CONHWSZ)NH; COCH2CH(CONHWSZ); X is a reactive residue of a di–functional ligand cpd. having an amino gp. in the molecule.

Abstract: SU759545B—relates to Crosslinked poly–N–hydroxysuccinimides are of formula (I), where R is gp. of formulae (Ia), (Ib), or (Ic), and R' is CH2–CH2 or CH2–CH–C6H5.

G. Giammona, et al., "Crosslinked α, β–Polyasparthydrazide Micromatrices for Controlled Release of Anticancer Drugs", Journal of Bioactive and Compatible Polymers, vol. 10, Jan. 1995, pp. 28–40.

G. Giammona, et al., "Synthesis and Characterization of Water–Swellable α, β–Polyasparthydrazide Derivatives", Colloid & Polymer Science, pp. 1637–1641 (1994).

Giammona, G., et al., "Crosslinked α, β–Polyasparthydrazide Hydorgels: Effects of Crosslinking Degree and Loading Method on Cytarabine Release Rate", Journal of Controlled Release, vol. 41, No. 3, Sep. 1, 1996, pp. 195–203, XP000599778.

A.P. Wheeler, et al., "Large Scale Thermally Synthesized Polyaspartate as a Biodegradable Substitute in Polymer Applications", Mat. Res. Soc. Symp. Proc. vol. 292, 1993 Materials Research Society, pp. 277–283.

G. Giammona, et al., "A New Water–Soluble Synthetic Polymer, α, β–Polyasparthydrazide, as Potential Plasma Expander and Drug Carrier", Journal of Controlled Release, 29 (1994), pp. 63–72.

Primary Examiner—Terressa Mosley
Attorney, Agent, or Firm—Thompson Coburn LLP; Gordon F. Sieckmann

[57] ABSTRACT

A first embodiment comprises reacting PSI with polyhydrazide selected from the group consisting of dihydrazides and trihydrazides and mixtures thereof, subsequently hydrolyzing the crosslinked PSI with base to produce crosslinked polyaspartate. A second embodiment comprises reacting PSI with hydrazine to form an intermediate product which is reacted with polyacyl chloride or polyester to produce crosslinked PSI followed by hydrolysis to form crosslinked salt. Isolation of the intermediate before reaction with the polyacyl chloride or polyester is unnecessary.

17 Claims, No Drawings

CROSSLINKED POLYASPARTATE SALTS A PROCESS FOR THEIR PRODUCTION

BACKGROUND OF THE INVENTION

Polysuccinimide ("PSI", also referred to as "anhydropolyaspartic acid" or "polyanhydroaspartic acid") may be prepared by the thermal polycondensation of L-aspartic acid. This polymer is then typically base hydrolyzed to form polyaspartate salt ("PAS") which has industrial uses such as scale and corrosion inhibitors and as a lubricant in a metal working fluid(s).

Crosslinking PSI and then converting PSI to its corresponding polymer salt gives its corresponding polymer salt a much desired superabsorbent property (hereinafter such polymer salts are referred to as superabsorbent polymers or "SAP") This property is highly desired since the crosslinked PSI can absorb many times its own weight of a liquid (such as water) thereby creating another important utility for use in diapers and the like. Over seventy different kinds of diapers are sold today in a $3.6 billion-a-year United States disposable diaper market for infants and for persons who suffer from stress urinary incontinence, a debilitating medical condition. These superabsorbent polymers are used as sanitary materials for other hygienic articles, for agricultural materials such as water-holding materials for soil and sheets for seedlings, food-related material/s such as food-freshness-keeping agents and dehydrating agents, public works materials or building materials such as dew inhibiting sheets on buildings and water sealing agents, and the like.

These superabsorbent polymers of the prior art which are prepared by initially crosslinking polymers which are typically not biodegradable. They tend to be environmentally durable and can exist in water or soil semi-permanently. Such durability is a desirable property for some uses; however, in others it might raise a concern at times in view of undesired environmental preservation after disposal because durable materials are not readily biodegraded to other biodegradable.

There have been several technical reports and disclosures disclosing a technique(s) for preparing water-insoluble superabsorbent polymers by crosslinking polyamino acids which have excellent safety and degradability.

Use of crosslinked PSI as an absorber is disclosed in U.S. Pat. No. 5,525,703 ('703) to Dennis J. Kalota, issued on Jun. 11, 1996, wherein the crosslinking agent is a specific polyamine. In that '703 patent and in U.S. Pat. No. 5,525,682 to Nagatomo et al., and in U.S. Pat. No. 5,461,085 to Nagatomo et al., which issued Oct. 24, 1995, crosslinking is carried out in solution in an organic solvent such as dimethyl formamide or while suspended in water. To isolate the crosslinked polymer, the water must be removed or the polymer precipitated and the solvent removed.

Prior art technical literature (G. Giammona et al., Synthesis and characterization of water swellable α, β-*polyasparthydrazide derivatives*, 272 COLLOID & POLYMER SCIENCE 1637–1641 (1994); G. Giammona et al., *Crosslinked α, β-Polyasparthydrazide Micromatrices for Controlled Release an Anticancer Drugs*, 10 JOURNAL OF BIOACTIVE AND COMPATIBLE POLYMERS 28–40 (1995); and G. Giammona, 41 JOURNAL OF CONTROLLED RELEASE 195–203 (1996)) discloses that a water-swellable polymer can be made from partially crosslinking polyasparthydrazide and glutaraldehyde producing a crosslinked polyhydrazide product. The polyasparthydrazide is made by reacting polysuccinimide with equal moles of hydrazine. All the PSI units are converted to hydrazide with the hydrazine and then the hydrazides are partially bridged with glutaraldehyde. However, the instant invention is unique from the art in that the superabsorbent polymer of this invention is a crosslinked PAS (sodium) salt and is not a crosslinked polyhydrazide as the prior art literature discloses.

Water absorbency by such a crosslinked polyhydrazide, which is typical of the prior art, is quite low.

OBJECTS OF THE INVENTION

An object of this invention is to provide crosslinked polyaspartate salts having high water absorbency as well as a process for preparing the same.

Other objects will be clear from the following detailed description and claims.

BRIEF SUMMARY OF THE INVENTION

This invention comprises crosslinked polyaspartate salts (PAS) and a process for forming such crosslinked polyaspartate salts which in a first embodiment comprises reacting PSI with a polyhydrazide selected from the group consisting of dihydrazides and trihydrazides and mixtures thereof, in particular dihydrazides such as malonic acid dihydrazide, adipic acid dihydrazide, terephthalic acid dihydrazide and mixtures thereof and trihydrazides such as 1,3,5 cyclohexanetricarboxylic acid trihydrazide and 1,3,5 benzenetricarboxylic acid trihydrazide and mixtures thereof, to form a crosslinked PSI and hydrolyzing said crosslinked PSI with base to produce the crosslinked polyaspartate salts of this invention.

A second embodiment of this invention comprises a process for preparing crosslinked polyaspartate salts as particularly identified herein, by reacting PSI with hydrazine to form an intermediate (illustratively referred to as an adduct) which is reacted subsequently or concurrently with polyacyl chloride such as diacyl chloride or triacyl chloride or a polyester such as a diester or triester, including mixtures thereof to produce a crosslinked polysuccinimide which is then hydrolyzed with a base to produce a crosslinked salt of polyaspartate. In this second embodiment, isolation of the adduct prior to reaction with the polyacyl chloride or polyester is not required.

In preparing SAP's according to this invention, the unique process opens some PSI rings with hydrazine and then bridges the open rings with polyacyl chloride or polyester.

As employed herein, the term "crosslinked polyaspartate salts" (PAS) includes crosslinked polyaspartic acid.

BRIEF DESCRIPTION OF THE SEVERAL VIEWS OF THE DRAWING:

(NOT APPLICABLE)

DETAILED DESCRIPTION OF THE INVENTION

Crosslinked polyaspartate salts of this invention include those having the following structural formula:

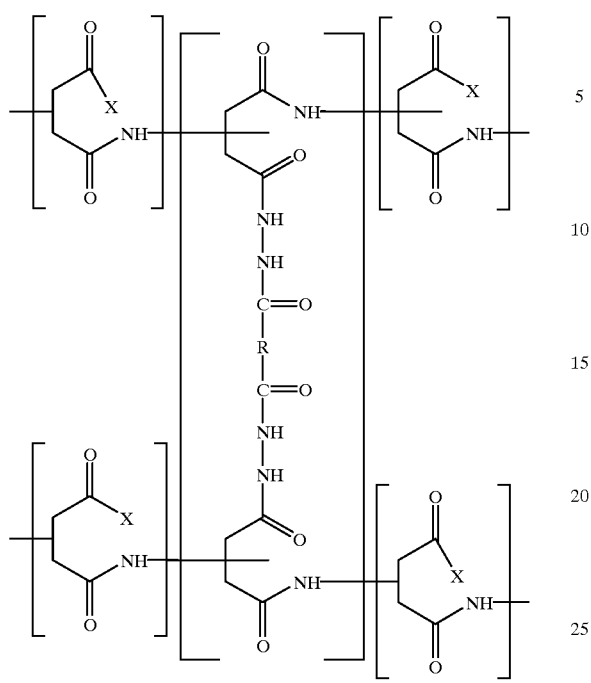

where R is optionally substituted linear or branched and selected from $C_0$ to $C_{30}$ alkyl and alkenyl and $C_0$ to $C_{20}$ alkyl-substituted aryl, including mono, di and triaryl, X is OM wherein M is hydrogen or water soluble cation such as an alkali metal cation or an alkaline earth metal, alkali metal, ammonium and mixtures thereof.

This invention provides crosslinked salts of polyasparates of the structural formula illustrated above and a process for preparing such salts which have superabsorbent properties. The sodium salt of crosslinked polyaspartate is a preferred alkali metal crosslinked polyaspartate salt. Also preferred are those crosslinked polyaspartate salts wherein R is unsubstituted linear or branched $C_1$ to $C_{20}$ alkyl, alkenyl, and cyclic and $C_0$ to $C_{10}$ alkyl substituted aryl. Also preferred are those polyaspartate salts wherein R is unsubstituted linear or branched $C_0$ to $C_{12}$ alkyl, alkenyl and cyclic and $C_0$–$C_5$ alkyl substituted aryl and wherein R is unsubstituted linear $C_1$ to $C_{10}$ alkyl, alkenyl and cyclic and unsubstituted aryl.

In a first embodiment illustratively shown below, a preferred dihydrazide is selected from malonic acid dihydrazide, adipic acid dihydrazide, terephthalic dihydrazide and mixtures thereof. Caustic is a preferred base to produce the crosslinked sodium polyaspartate of this invention by subsequent hydrolysis although other suitable bases may be employed.

Without being bound by theory, it is believed that such a reaction using terephthalic dihydrazide is illustrated as follows:

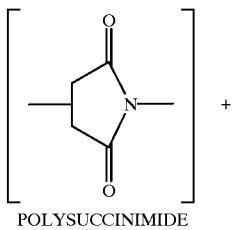
POLYSUCCINIMIDE

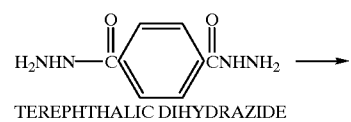
TEREPHTHALIC DIHYDRAZIDE

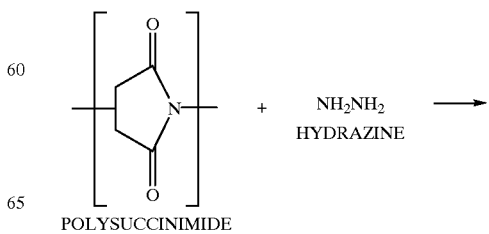

In the second embodiment, it is preferred to react PSI with hydrazine to form an intermediate product (adduct) which is subsequently reacted preferably with a diacyl chloride or a diester, mixtures thereof to produce a desired crosslinked polysuccinimides and thereafter hydrolyzing said crosslinked PSI as noted above. In this second embodiment, isolation of the adduct is not required.

The following schematic illustrates the second embodiment of this invention. Reactants shown in this schematic above are for illustration only and are the preferred reactants.

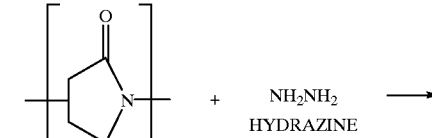
POLYSUCCINIMIDE

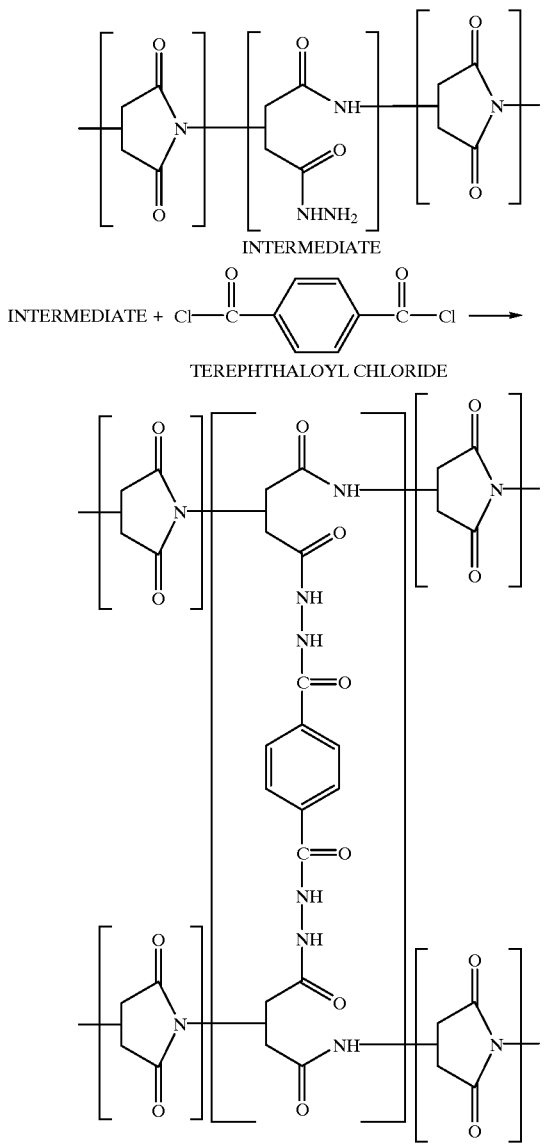

Polysuccinimides to be crosslinked with crosslinkers of the first and second process embodiments of this invention are those polysuccinimides which have a molecular weight in the range of about 15,000 to about 200,000 or more preferably from about 20,000 to about 100,000. Such preformed polymers may be prepared by known means such as described in U.S. Pat. No. 5,142,062 and U.S. Pat. No. 5,484,945, the disclosures of which are incorporated herein by reference in their entirety.

PSI is preferably prepared by those processes and in systems known in the prior art. Reactors of various types are used in the reaction converting aspartic acid to PSI by thermal condensation. Catalysts such as phosphoric acid may be employed to reduce the time required to condense the L-aspartic acid while subjected to heat and removal of water in a known manner. In accordance with this invention, the PSI from the thermal condensation reaction may be employed directly in the process of this invention.

The crosslinking reaction in both embodiments of this invention can occur at room temperature or at elevated temperature to reduce reaction time. Suitable reaction conditions need only be those which provide sufficient time and sufficient temperature for the reaction to occur to a desired sufficient degree. Those of skill in the art will recognize that the reaction conditions are not critical and may be varied if desired.

Typically such suitable reaction conditions for embodiments of the process of this invention include a temperature in the range from about 30° C. to about 210° C and preferably from about 50° C. to about 150° C. although those of skill in the art will recognize that greater or lesser temperatures may be employed.

Typically the time required for sufficient reaction to occur in both process embodiments is a suitable time in the range from about 2 hours to about 24 hours and preferably from about 5 hours to about 10 hours although those of skill in the art will recognize that greater or lesser times may be employed if desired and if needed to complete the necessary reactions to the desired degree of completion.

Illustrative solvents which may be employed in the crosslinking process of this invention in process embodiments includes those such as DMF (N, N-dimethylformamide), DMSO (dimethyl sulfoxide), NMP(1-methyl-2-pyrrolidinone), dimethylacetamide, mixtures thereof and the like although those of skill in the art will recognize that other similar solvents may be employed if desired and that the solvent employed is not critical. DMF is preferred.

Bases which may be employed in the process of this invention in both embodiments include caustic soda, alkaline earth metal hydroxide, alkali metal hydroxide, ammonium hydroxide, mixtures thereof and the like. Those of skill in the art will recognize that any suitable base can be employed if desired and that the foregoing list is for illustration only.

For various applications, the crosslinked polyaspartate salt from both embodiments may be partially neutralized with acid which can be hydrochloric acid, sulfuric acid, phosphoric acid, nitric acid, mixture thereof and the like. Those of skill in the art will recognize that any suitable acid can be employed and the foregoing list is for illustration only.

Crosslinked polymers having a wide range of properties can be prepared according to this invention depending upon the degree of crosslinking achieved in the reaction of PSI with crosslinker which is largely controlled by the amount of crosslinker employed. Products having varying water solubility can be provided by controlling the mole ratio of PSI to crosslinker in the first embodiment. Typically the mole ratio of PSI to polyhydrazide is in the range from about 20:1 to about 5:1 and more preferably from about 10:1 to about 7:1 although greater or lesser ratios may be employed.

Similarly for the second embodiment, the ratio of PSI to hydrazine may be varied in the range from about 20:1 to about 5:1 and more preferably from about 10:1 to about 7.5:1 although greater or lesser ratios may be employed if desired.

Also for the second embodiment, the ratio of polyacyl chloride or the ratio of the polyester (or mixtures thereof) to hydrazine may be varied from about 3:1 to about 1:1 although greater or lesser ratios may be employed if desired as those of skill in the art will recognize after reading this specification.

In practicing the second embodiment of the process of this invention, the addition of the crosslinker, the polyacyl chloride or polyester may be employed subsequently or concurrently to the reactant hydrazine if desired.

Typically the amount of solvent employed will be an effective amount so that the desired process may be accomplished with relative ease. The solvent should be present in sufficient quantity and have sufficient solvating power to sufficiently provide the needed solvent capacity.

le;2qThose of skill in the art will recognize that mixtures of reactants may be employed in the practicing this invention although illustrations herein are of individual reactants. Thus a mixtures of polyhydrazides, PSI's, hydrazines, etc. may be employed if desired as well as mixtures of polyacyl chloride, polyester etc.

Crosslinked polyaspartate salts prepared via the crosslinking process of this invention are useful in many applications including thickeners, deflocculants, flocculants and absorbers.

The following specific EXAMPLES illustrating the best currently-known mode of making and using the instant invention and are provided to facilitate a clear understanding of the invention. It should be understood, however, that the detailed expositions of the application of the invention, while indicating preferred embodiments, are given by way of illustration only and are not to be construed as limiting the invention since various changes and modifications within the spirit and scope of the invention will become apparent to those skilled in the art from this detailed description.

EXAMPLES

Example 1 illustrates the first embodiment of this invention when using malonic acid dihydrazide as the crossslinker for polysuccinimides, i.e., R in Formula I is $CH_2$. The subsequent hydrolysis procedures with caustic and the product absorbency follow.

Example 1

In a 250 cc three-necked flask equipped with mechanical stirrer, thermometer, addition funnel, and heating mantle were charged 5 gm (0.0515 mole) of polysuccinimide (PSI) with a molecular weight of 70000, along with 25 cc DMF. The system was heated to 40° C. with agitation to ensure a total dissolution. A hot (about 80° C.) solution of 1 gm (0.0076 mole) malonic acid dihydrazide in 50 gm DMF was added to the reactor. The mixture temperature went up to 50° C. at the end of the addition and was kept at 60° C. for 16 hours with stirring. Then DMF was stripped away under vacuum with a Rotavap. The resulted dry flakes were washed with methanol and filtered. It was further dried in a vacuum oven before the hydrolysis. About 5.8 gm of the partially crosslinked polysuccinimides was collected.

Two grams (ca. 0.0206 mole) of the crosslinked PSI was subjected to the aqueous suspension hydrolysis. The PSI was placed in a beaker with 145 gm water and the mixture was stirred at 60° C. About 6.4 cc 10% (w/v)(0.016 mole) NaOH solution was charged while the system's pH was being controlled at 10.8–11. After the caustic addition the mixture was stirred for another 30 minutes at room temperature. It was filtered through a fritted disc funnel (25–40 micron) and a light gel was formed in the funnel. The light gel was discharged into methanol and the solid precipitated out was separated by filtration and dried to obtain 0.29 gm of a superabsorbent polymer (SAP).

This solid gave an absorption of 26.4 gm/gm of the SAP in the saline solution by a tea bag test. The tea bag method is disclosed in U.S. Pat. No. 5,461,085 which issued to Nagatomo et al. on Oct. 24, 1995 and which is incorporated herein in its entirety by reference.

Example 2

Using the procedure of EXAMPLE 1, adipic acid dihydrazide was employed as dihydrazide illustrating the first embodiment for crosslinking in this Example and a hydrolysis procedure was employed to make the final product of this invention. This Example yielded a lower absorbency of this product compared with Example 1 above.

This may have resulted from a lower crosslinking reaction which may be due to the low solubility of the adipic acid dihydrazide in the process solvent DMF.

In a 250 cc three-necked flask equipped with mechanical stirrer, thermometer, addition funnel, and heating mantle were charged 5 gm (0.0515 mole) of polysuccinimides (PSI) with a molecular weight of 38000, along with 25 cc DMF. The system was heated to 40° C. with agitation to ensure a total dissolution. A warm suspension of 0.92 gm (0.0053 mole) adipic acid dihydrazide in 27 gm DMF was added to the reactor. The mixture was stirred and was kept at 60° C. for 6 more hours and then it was held at room temperature for 2 more days without stirring. A peach-colored soft gel was formed. Then the DMF was stripped away under vacuum with a Rotavap. The resulting dry flakes were washed with methanol and filtered. It was further dried in a vacuum oven before the hydrolysis. About 5.8 gm of the crosslinked polyusccinimides was collected.

One gram (ca. 0.0103 mole) of the crosslinked PSI was subjected to a hydrolysis using 4.1 cc 10% (w/v) (0.0103 mole) NaOH solution. After the addition of 100 cc methanol, a white gum precipitated and was separated by filtration. About 0.69 gm material was collected. This solid gave an absorption of 9.5 gm/gm of the SAP in water and 4.8 gm/gm of the SAP in the saline solution by a tea bag test.

Example 3

Terephthalic dihydrazide was used as an illustration of a suitable dihydrazide for crosslinking in this example as another illustration of the first embodiment of the process of this invention. This crosslinker was sparingly soluble in DMF and the product gave low absorbency.

In a 500 cc three-necked flask equipped with mechanical stirrer, thermometer, addition funnel, and heating mantle were charged 4 gm (0.0412 mole) of polysuccinimide (PSI) with a molecular weight of 38000, 1 gm of terephthalic dihydrazide, along with 250 cc DMF. The mixture was stirred at 60° C. for 16 more hours. Then it was filtered to remove some unreacted dihydrazide (about 0.5 gm was recovered). The DMF was stripped away under vacuum by a Rotavap. The resulting dry flakes were washed with methanol and filtered. It was further dried in a vacuum oven before the hydrolysis. About 5.26 gm of the partially crosslinked polysuccinimide (containing some DMF) was collected.

One gram (ca. 0.0103 mole) of the crosslinked PSI was hydrolyzed with 4.1 cc 10% (w/v)(0.0103 mole) NaOH solution added. After the addition of 250 cc methanol, a yellow solid precipitated out and was separated by filtration. About 0.78 gm dry material was collected. This solid gave an absorption of 6.8 gm/gm of the SAP in water and 2.0 gm/gm of the SAP in the saline solution by a tea bag test.

EXAMPLE 4 shows the procedure of reacting PSI with hydrazine and the procedure of isolating this polymer product. This illustrates the second embodiment of the process of this invention.

Example 4

EXAMPLE 4 has a Part A which illustrate the preparing of polyasparthydrazide polysuccinimide. Part B illustrates the subsequent crosslinking of polyasparthydrazide polysuccinimide carried out by the process of this invention. Part C illustrates the hydrolysis of the crosslinked PSI (polyasparthydrazide polysuccinimide) from Part B.

Part A. Preparation of Polyasparthydrazide Polysuccinimide

In a 100 cc three-necked flask equipped with mechanical stirrer, thermometer, addition funnel, and heating mantle were charged 10 gm (0.1031 mole) of polysuccinimides (PSI) with a molecular weight of 38000, along with 50 cc DMF. The system was heated to 40° C. with agitation to ensure a total dissolution. Then 0.33 gm (0.0103 mole) hydrazine in 5 gm DMF was added to the reactor at room temperature. The mixture was stirred overnight at room temperature. The clear reddish solution was transferred to a dropping funnel and was charged into a stirred water/ice to precipitate the hydrazide/PSI product. The solid was filtered and vacuum oven dried. About 9.7 gm product was collected.

Part B. Crosslinking Polyasparthydrazide Polysuccinimide Using Terephthaloyl Chloride as a Crosslinker This part illustrates the process of crosslinking the above adduct of Part A of this Example above employing terephthaloyl chloride as a crosslinker.

In a 100 cc three-necked flask equipped with mechanical stirrer, thermometer, addition funnel, and heating mantle were charged 2 gm of the product from Example 1, along with 10 cc DMF. The system was heated to 50° C. with agitation to ensure a total dissolution. Then 0.42 gm (0.0041 mole) triethylamine was added to the reactor at about 50° C. The system was cooled to 26° C. and 0.42 gm terephthaloyl chloride in 4.2 gm DMF was added dropwise. Gel was formed gradually and more fresh DMF (45 cc) was added. The two-phase mixture was stirred at about 26° C. for 1 hour and was placed on a Rotavap to strip off the DMF. About 3.65 gm solid was collected. This solid was ground and then washed with cold water several times to remove the triethylamine hydrogen chloride salt. The wet solid was washed with methanol and vacuum dried, 2.48 gm was collected.

Part C shows the procedure of the hydrolysis of the crosslinked PSI from Example 4, Part B above, and provides data as to the absorbency of the product.

Part C. Hydrolysis of the Crosslinked PSI from Part B 1.0 gm (ca. 0.0103 mole) of the crosslinked polymer from Part B above was suspended in 250 cc of water at about 60° C., to which 4.1 cc 10% W/V (0.0103 mole) NaOH solution was added dropwise while controlling the pH around 11 to hydrolyze the remaining imide ring. After the addition, it was cooled to room temperature and was filtered through a coarse size fritted funnel. Only a small amount of filtrate was collected and a thin gel was formed on the funnel. The gel was charged to a stirred methanol and a gray ball of the crosslinked sodium polyaspartate was formed. It was then ground and dried in a vacuum oven for about 60 hours. About 0.5 gm superabsorbent polymer was made. This SAP gave an absorption of 40 gm/gm of the SAP in the saline solution by the tea bag test.

EXAMPLE 5, Part A next illustrates how one of skill in the art can form the same crosslinked polymer as formed in Example 4 above but without isolating the intermediate adduct after the reaction with hydrazine. In this Example 5, about 12 molar percent of crosslinker was employed.

Example 5

Part A. Preparation of a Crosslinked Polysuccinimides Without Isolation of an Intermediate Adduct In a 1 L four-necked round bottom flask equipped with mechanical stirrer, thermometer, addition funnel, and heating mantle were charged 10 gm (0.1031 mole) of polyusccinimides (PSI) with a molecular weight of 66000, along with 400 cc DMF. The system was heated to 40° C. with agitation to ensure a total dissolution. Then 0.40 gm (0.0125 mole) hydrazine in 10 cc DMF was added at room temperature. The mixture was stirred at room temperature for 2.5 hours. Then 2.48 gm (0.0245 mole) triethylamine was added to the reactor and followed with an addition of 300 cc DMF to the system. Then 2.5060 gm (0.0123 mole) terephthaloyl chloride in 6 cc DMF was added dropwise. Gel was formed gradually and it became thicker as the reaction progressed. The thick and cloudy mixture was stirred at about 26° C. for 1.5 hour and was placed on a Rotavap to strip off the DMF. About 21.6 gm solid was collected, ground, and washed with cold water several times to remove the triethylamine hydrogen chloride salt. The solid was dried in a vacuum oven at 60° C. and 11.54 gm product was collected.

Part B. Hydrolysis of the Product of Part A of This Example 5 Above Illustrating Hydrolysis of Crosslinked PSI Product 2.0 gm (ca. 0.0206 mole) of the crosslinked polymer from Part A of this Example was suspended in 300 cc of water at about 50° C., to which 7.4 cc 10% W/V (0.0103 mole) NaOH solution was added dropwise while controlling the pH around 11 to hydrolyze the remaining imide ring. After the addition, it was cool to room temperature and was filtered through a course size fritted funnel. Only a small amount of filtrate was collected and a light gel was formed on the funnel. The gel was charged to a stirred methanol (1.5 L) and a gray gummy ball of the crosslinked sodium polyaspartate was formed. It was then ground and dried in a vacuum oven. 2.07 gm superabsorbent polymer was made. One gram of this SAP was able to absorb 51 gm saline solution or 138 gm water by the tea bag test showing that it is an SAP.

EXAMPLE 6 is somewhat similar to EXAMPLE 5 and provides an illustration of the process of this invention using about 10 molar percent of hydrazine usage. The product of this Example performed less satisfactory (absorbency) than that of Example 5 which used about 12 molar percent of hydrazine. Both products illustrate this invention and are SAPs.

Example 6

In a 250 cc three-necked flask equipped with mechanical stirrer, thermometer, addition funnel, and heating mantle were charged 2.5 gm (0.0257 mole) of polysuccinimides (PSI) with a molecular weight of 68100, along with 100 cc DMF as a solvent. The system was heated to 40° C. with agitation to ensure a total dissolution. Then 0.0874 gm (0.0025 mole) hydrazine in 5 gm DMF was added slowly to the reactor at room temperature. The mixture was stirred at room temperature for 4 hours. Then 0.62 gm (0.0061 mole) triethyl amine was added to the system. After 30 minutes, 0.5271 gm (0.0026 mole) terephthaloyl chloride (TPC) in 5 cc DMF was added dropwise. Gel was formed immediately and more fresh DMF (50 cc) was added. The apple-sauce like gel was stirred for another 30 minutes after the TPC addition and was charged to a stirred 1500 cc water/ice. A pink paste slurry was formed and was filtered through medium size fritted disc funnel. A small amount of a brown solid was formed on the filter and was washed with methanol several times before the vacuum oven drying at 60° C. About 2.2 gm crosslinked PSI was obtained.

One gram (ca. 0.0103 mole) of this crosslinked PSI was employed for hydrolysis. It was stirred in 250 cc water and was gradually heated up to 60° C. About 3.3 cc 10% w/v (0.0083 mole) caustic solution was added while the system pH was controlled between 10.8–11.0. The final pH was 10.26 of this thick cloudy suspension of small particles after the caustic addition. The gel was placed on a fritted disc funnel under suction to remove water as much as possible. The 160 gm thicker gel was then charged to 1500 cc methanol and the solid precipitated out was filtered and vacuum dried. About 1.05 gm (80% yield) of the hydrolyzed crosslinked sodium polyaspartate was collected. This SAP gave a 29 gm/gm of SAP absorption in saline solution and 70 gm/gm in water by a tea bag test.

EXAMPLE 7 shows that partially acidified crosslinked polyaspartate gives good absorbency. The crosslinked PSI from Example 5, Part A was hydrolyzed as in Example 5, Part B, but in this Example the hydrolyzed product was neutralized somewhat with hydrochloric acid.

Example 7

One gram (ca. 0.0103 mole) of the crosslinked PSI from EXAMPLE 5, Part A was hydrolyzed the same way as in Part B of Example 5. At the end of caustic addition, the system pH was about 10.7. Then 14.8 cc 0.1N HCL solution was added slowly. The pH became 9.38. It was cooled to room temperature and the gel was filtered. 156 gm gel was charged to the stirred methanol and the mixture was filtered. The wet solid was dried in vacuum oven overnight and 0.85 gm SAP was obtained. This product gave a 47 gm/gm of SAP absorption in saline solution showing that it is an SAP.

EXAMPLE 8 illustrates another embodiment to form the same type crosslinked polysuccinimides. In this EXAMPLE, a combination of hydrazine and dimethyl terephthalate was employed together. Since dimethyl terephthalate is fairly soluble in hot DMF, it resulted in good crosslinking.

Example 8

In a 250 cc three-necked flask equipped with mechanical stirrer, thermometer, addition funnel, and heating mantle were charged 10.0 gm (0.1031 mole) of polysuccinimides (PSI) with a molecular weight of 38000, along with 100 cc DMF as a solvent. The system was heated to 40° C. with agitation to ensure a total dissolution. Then 0.32 gm (0.01 mole) hydrazine in 5 cc DMF was added slowly to the reactor at room temperature. The mixture was stirred at room temperature for 16 hours. The opaque brown slurry was transferred to a dropping funnel and was charged into a stirred water/ice to precipitate the hydrazide/PSI adduct. The solid was filtered and vacuum oven dried. About 8.7 gm product was collected.

Two grams (ca. 0.0206 mole) of the above hydrazine/PSI adduct was stirred in 80 cc DMF in a 250 cc flask. To the PSI solution, a 10 cc hot (65° C.) DMF solution of dimethyl terephthalate (0.3981 gm) was added slowly. The mixture was stirred at 67° C. for 3 hours, room temperature for 16 hours, and then 67° C. for 3 more hours. DMF was stripped from the solution by a Rotavap. The solid was washed and dried and 2.37 gm was produced. 0.5 gm (ca. 0.0052 mole) of this partially crosslinked PSI was ground in a mortar & pestle for about 10 minutes while 2.1 cc 10% NaOH (w/v) (0.0053 mole) was added. A white paste was formed. It was transferred to a fritted disc funnel and was mixed with methanol several times. The white gummy solid was dried in a vacuum oven and 0.32 gm product was collected. This product gave a 14 gm/gm SAP absorption in saline solution from a tea bag test proving that it is an SAP.

Although this invention has been described in terms of specific embodiments which are set forth in considerable detail herein, it should be understood that this description is by way of illustration only and that the invention is not necessarily limited thereto, since alternative embodiments and operating techniques will become apparent to those skilled in the art (in view of the disclosure). Accordingly, modifications are contemplated which can be made without departing from the spirit and scope of the described invention.

What is claimed is:

1. A process for forming crosslinked polyaspartate salts having a saline solution (tea bag) absorbency greater than about 2 gm./gm., which comprises polysuccinimide (PSI) with a polyhydrazide selected from the group consisting of dihydrazides and trihydrazides to form a crosslinked PSI and subsequently hydrolyzing said crosslinked PSI to produce crosslinked polyaspartate salts.

2. A process for preparing crosslinked polyaspartate salt which comprises reacting PSI with hydrazine to form an intermediate product, subsequently or concurrently reacting the product with polyacyl chloride or polyester to produce crosslinked polysuccinimide and then hydrolyzing the crosslinked polysuccinimide to produce crosslinked polyaspartate.

3. The process of claim 1 wherein said polyhydrazide is a dihydrazide selected from the group consisting of malonic acid dihydrazide, adipic acid dihydrazide, terephthalic dihydrazide and mixtures thereof.

4. The process of claim 1 wherein said polyhydrazide is a trihydrazide.

5. The process of claim 2, wherein said polyacyl chloride is diacyl chloride.

6. The process of claim 2, wherein said polyester is a diester.

7. The process of claim 3 wherein the dihydrazine is malonic acid dihydrazide.

8. The process of claim 3 wherein the crosslinker dihydrazide is adipic acid dihydrazide.

9. The process of claim 3 wherein the crosslinker dihydrazide is terephthalic dihydrazide.

10. Crosslinked polyaspartate salts having a saline solution (tea bag) absorbency greater than about 2 gm./gm. having the following structural formula:

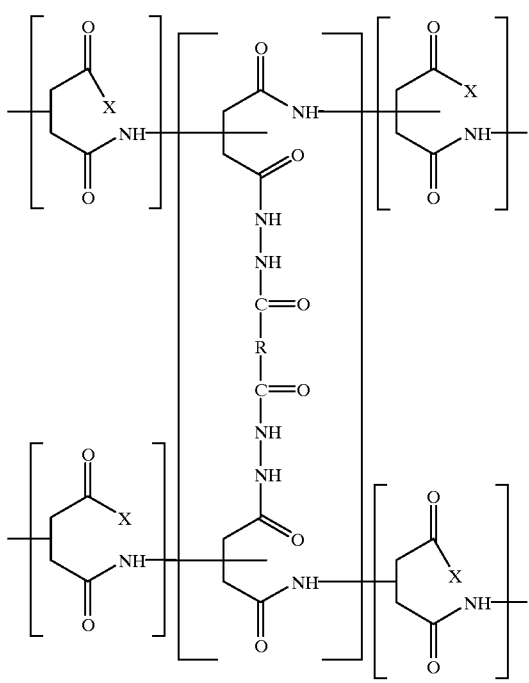

where R is optionally substituted linear or branched and selected from $C_0$ to $C_{30}$ alkyl and $C_0$ to $C_{20}$ alkyl-substituted aryl, X is OM wherein M is selected from hydrogen, water soluble cation, alkaline earth metal, alkali metal, ammonium or mixtures thereof.

11. The crosslinked polyaspartate salt of claim 10 wherein said R group is unsubstituted linear or branched $C_0$ to $C_{20}$ alkyl, alkenyl, and cyclic and $C_0$ to $C_{30}$ alkyl-substituted aryl.

12. The crosslinked polyaspartate salts of claim 11 wherein R is unsubstituted linear or branched $C_0$ to $C_{12}$ alkyl, alkenyl and cyclic and $C_0$ to $C_5$ alkyl-substituted aryl.

13. The crosslinked polyaspartate of claim 12 wherein R is unsubstituted linear or branched $C_0$ to $C_{10}$ alkyl, alkenyl and cyclic and nonsubstituted aryl.

14. The crosslinked polyaspartate salt of claim 10 wherein said X is alkali metal.

15. The crosslinked polyaspartate salt of claim 14 wherein said alkali metal is sodium or potassium. polyacyl chloride or polyester is unnecessary.

16. The process of claim 1 wherein said saline solution (tea bag) absorbency is at least 14 gm./gm.

17. The composition of claim 10, wherein said saline solution (tea bag) absorbency is at least 14 gm./gm.

* * * * *

UNITED STATES PATENT AND TRADEMARK OFFICE
CERTIFICATE OF CORRECTION

PATENT NO. : 5,981,761
DATED : November 9, 1999
INVENTOR(S) : Yueting Chou, et al.

It is certified that error appears in the above-identified patent and that said Letters Patent are hereby corrected as shown below:

Column 3, line 35, the word "polyasparates" should be --polyaspartates--
Column 7, line 26, the word "crossslinker" should be --crosslinker--
Column 8, line 24, the word "polyuscinimides" should be --polysuccinimides--
Column 10, line 7-8 the word, "polyuscinimides" should be --polysuccinimides--
In the Title of the Invention, please insert the word --AND-- after the word "SALTS".

Signed and Sealed this

Twenty-second Day of May, 2001

Attest:

NICHOLAS P. GODICI

Attesting Officer    Acting Director of the United States Patent and Trademark Office